DIGITAL TIMER

Filed Feb. 20, 1967 4 Sheets-Sheet 1

INVENTORS.
AKIRA ABE
ISAO HATANO
BY Kurt Kelman
AGENT

INVENTORS.
AKIRA ABE
ISAO HATANO
BY Kurt Kelman
AGENT

Fig. 6
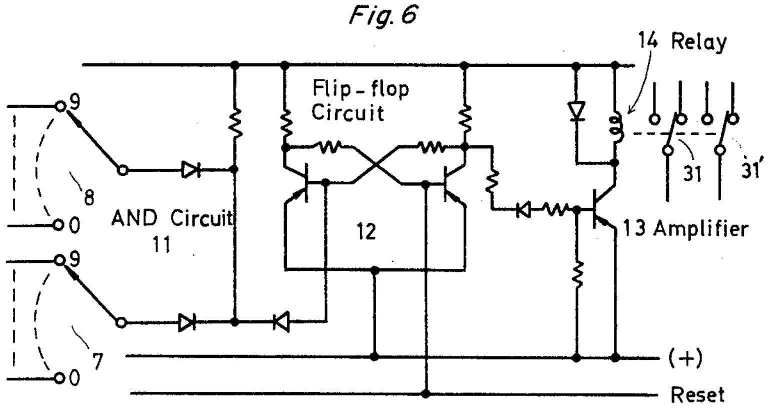
Fig. 7
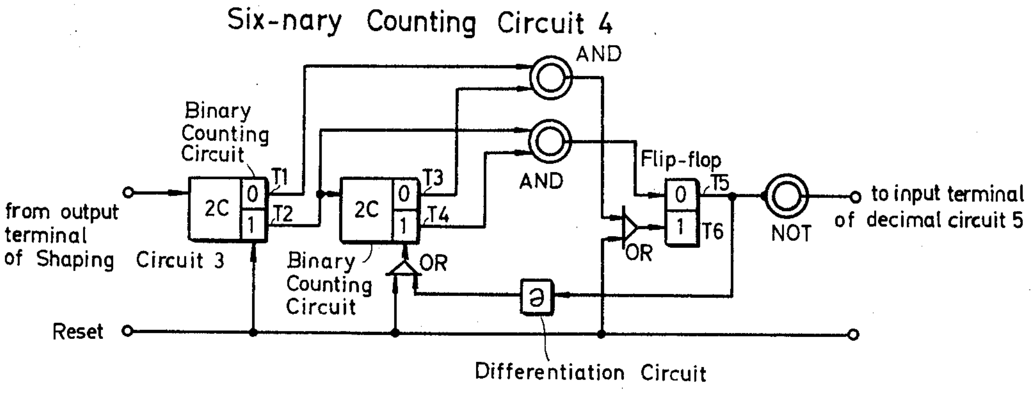
Operation Table of Six-nary Counting Circuit
Number of the Input Pulses
| | T1 | T2 | T3 | T4 | T5 | T6 |
|---|---|---|---|---|---|---|
| 0 | 0 | 1 | 0 | 1 | 0 | 1 |
| 1 | 1 | 0 | 0 | 1 | 0 | 1 |
| 2 | 0 | 1 | 1 | 0 | 0 | 1 |
| 3 | 1 | 0 | 0 | 1 | 1 | 0 |
| 4 | 0 | 1 | 1 | 0 | 1 | 0 |
| 5 | 1 | 0 | 1 | 0 | 1 | 0 |
Fig. 8
INVENTORS.
AKIRA ABE
ISAO HATANO
BY Kurt Kelman
AGENT Decimal Counting Circuit Operation Table of Decimal Counting Circuit Number of the Input Pulses

| | T1 | T2 | T3 | T4 | T5 | T6 | T7 | T8 |
|---|---|---|---|---|---|---|---|---|
| 0 | 0 | 1 | 0 | 1 | 0 | 1 | 0 | 1 |
| 1 | 1 | 0 | 0 | 1 | 0 | 1 | 0 | 1 |
| 2 | 0 | 1 | 1 | 0 | 0 | 1 | 0 | 1 |
| 3 | 1 | 0 | 1 | 0 | 0 | 1 | 0 | 1 |
| 4 | 0 | 1 | 0 | 1 | 1 | 0 | 0 | 1 |
| 5 | 1 | 0 | 1 | 0 | 0 | 1 | 1 | 0 |
| 6 | 0 | 1 | 0 | 1 | 1 | 0 | 1 | 0 |
| 7 | 1 | 0 | 0 | 1 | 1 | 0 | 1 | 0 |
| 8 | 0 | 1 | 1 | 0 | 1 | 0 | 1 | 0 |
| 9 | 1 | 0 | 1 | 0 | 1 | 0 | 1 | 0 |

INVENTORS.
AKIRA ABE
ISAO HATANO
BY Kurt Kelman
AGENT

United States Patent Office 3,499,279

Patented Mar. 10, 1970

3,499,279
DIGITAL TIMER

Akira Abe, 168 Tenou-cho, Takatsuki-shi, Osaka-fu, Japan, and Isao Hatano, 14-5 Tomooka, Nishiyama, Nagaoka-cho, Otokuni-gun, Kyoto-fu, Japan Continuation-in-part of application Ser. No. 432,783, Feb. 15, 1965. This application Feb. 20, 1967, Ser. No. 628,199

Int. Cl. G04f 3/06

U.S. Cl. 58—39.5 7 Claims

ABSTRACT OF THE DISCLOSURE

An apparatus for counting a preset number of clock pulses and continuously displaying the total number of pulses received. A moving mechanical system is used as an analog display. The static digital counter cuts off the analog display when the preset number is reached.

The application is a continuation-in-part of our now abandoned application No. 432,783, filed Feb. 15, 1965, entitled Digital Timer.

The invention relates to a digital timer, and more particularly to an improvement of the display means of a digital timer.

In general, digital timers are constructed with a static counter which counts a number of clock pulses applied thereto and provides an output signal when the counter receives a predetermined number of clock pulses. Digital timers also contain display means which indicate the total number of pulses received during any timing operation.

In one type of prior art arrangement the displaying device is comprised of discharge tubes placed in parallel and corresponding in number to the amount of figures to be displayed. In counting the number of discharge tubes activated the total number of clock pulses are determined.

Another type of display device in use comprises display panels having numerical gradations with a separate neon lamp corresponding to each gradation. In this method the number of clock pulses received is read by reading the numerical gradation at the illuminated position of each of the display panels.

A third type of display arrangement in use provides for a series of discharge tubes each corresponding to a digit of the total number. Each discharge tube has a set number of cathode positions. The number of clock pulses received is read by checking the illuminated cathode position of the discharge tubes.

In general all digital timers employ a static displaying means which provides a digital reading. The displaying means conventionally uses discharge tubes, a dekatron or similar devices. These types of displaying means are combined with a counter comprised of static devices to produce a digital timer.

A typical arrangement is shown by Weighton et al., Automatic Control Arrangement, Patent No. 3,120,652, wherein electronic circuits are combined to form a clock which counts the number of pulses from a suitable pulse source. The clock itself feeds a time display which digitally indicates the time recorded on the master clock. The use of a dekatron counting device is typically shown by Stanley, Time Meter, Patent No. 3,004,218. A binary counter can also be used as shown by Stelton, Electronic Timing Device, Patent No. 2,970,226.

In all the conventional arrangements the display means is limited by size and cost. Since the numbers represented generally consist of a plurality of figures, a plurality of tubes is required, resulting in high manufacturing costs and excessive space requirements.

Furthermore, the standard embodiments of display means only show the time elapsed by indicating total pulses received. They have no provision for displaying the remaining time of the setting.

In accordance with this invention a movable mechanism such as a synchronous motor is employed in the display means. The display means is in parallel with the counting device and displays independently of the counter. The total pulses received are indicated by an analog display rather than a conventional digital display. As the number of figures increase, there is no need for an increase in any equipment. Further the system is cheaper, smaller and is capable of working in fields where a digital indication is not necessarily required.

It is therefore an object of this invention to provide a digital timer using a static counting device and an analog display apparatus.

A further object is to describe an analog display device using a synchronous motor as the driving mechanism. of a rotating indicator.

Another object is to provide an accurate digital counter using a six-nary counting circuit in conjunction with a decimal counting circuit.

A further object is to provide a digital timer where the counting circuit will cut off the display apparatus when the preset number is reached.

Further objects and advantages will become apparent from the following description and the accompanying figures in which:

FIG. 6 is a circuit diagram of the "and" circuit, the amplifier circuit and the memory circuit of FIG. 2;

FIG. 7 is a circuit diagram of the six-nary counting circuit of FIG. 2;

FIG. 8 is an operation table explaining the circuit of FIG. 7;

Figure 1:
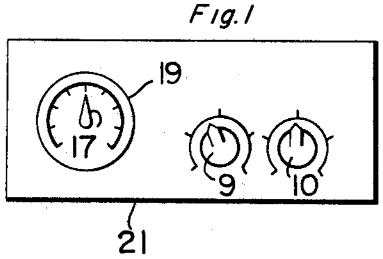
FIG. 1 is a front elevation of the display device in accordance with this invention.
Figure 2:
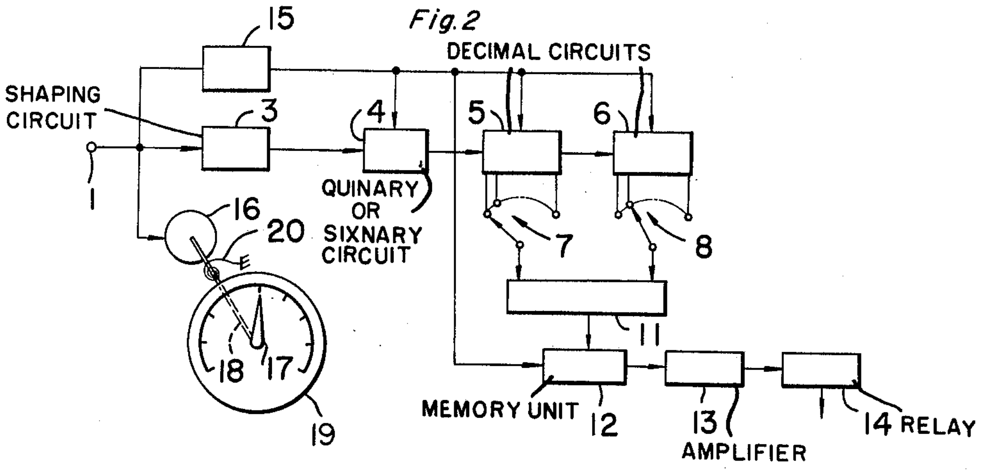
FIG. 2 is a block diagram of the display device in accordance with this invention.

Referring to FIGS. 1 and 2, an alternating current source is applied to terminal 1. For example, a 100 volt A.C. source of 50 or 60 c.p.s. is used. Connected to the A.C. source is the input terminal. The A.C. waveform passes through a shaping circuit 3 where it is transformed into a 50 or 60 c.p.s. square wave. The counting section of the digital timer consists of a quinary or six-nary circuit 4; a first decimal circuit 5; and a second decimal circuit 6. Connected to the outputs of both decimal circuits 5, 6 are rotary switches 7, 8 controlled by knobs 9, 10, respectively (FIG. 1). The outputs of the rotary switches are fed to an "and" circuit 11. "And" circuit 11 is connected to relay 14 through memory unit 12 and amplifier 13. When relay 14 closes reset 15 is activated.

The display apparatus of the digital timer is driven by synchronous motor 16 which is activated directly from the AC source 1. A needle 17 is connected to the output shaft 18 of the synchronous motor 16 and rotator around scaled disc 19. The display disc 19, together with knobs 9 and 10, are mounted on panel 21 for operation. Spring 20 is connected to the needle to reset it to its starting position.

When the digital timer has counted the predetermined number of pulses, relay 14 operates to deenergize motor 16. Reset 15 is placed in a ready state and retains the circuits as they were until an external signal causes it to reset circuits 4, 5, 6 and 12. The reset 15 is also used to set the counters and the memory circuit to the predetermined state when the electric source is first applied.

As an illustrative example, assume circuit 4 to be a six-nary circuit and knobs 9 and 10 set at positions 2 and 6, respectively. To operate the device an A.C. voltage of 60 c.p.s. is applied at terminal 1. Shaping circuit 3 shapes the wave and converts it into a rectangular wave. Six-nary circuit 4 operates as a frequency divider to supply a signal every 0.1 second to the first decimal circuit 5 which supplies a signal every second to second decimal circuit 6. Simultaneously with the commencement of counting, the counters synchronous motor 16 starts, and motor 16 causes needle 17 to rotate around disc 19. Disc 19 is appropriately scaled with gradations synchronized to the number of digits counted by the counting circuits. When the decimal circuits 5, 6 count 6.2 seconds, needle 17 also registers a value of 6.2 secs. on disc 19. Decimal circuits 5, 6 supply a signal through rotary switches 7, 8 to "and" circuit 11. The output from the "and" circuit drives memory circuit 12 to operate relay 14 through amplifier 13. The operation of relay 14 acts to cut off the supply of voltage to synchronous motor 16 and resets needle 17 to the initial zero position by means of reset spring 20.

Figure 3:
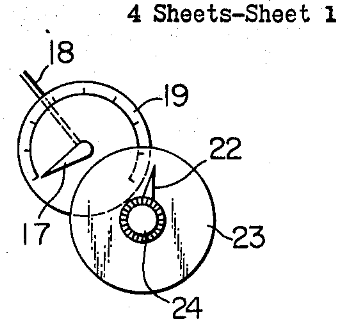
FIG. 3 is a view in elevation of another embodiment of the display device.

FIG. 3 is a view in elevation of another embodiment of the display device. Setting needle 22 is connected to a transparent protective scale cover 23 by means of a knob 24. Setting needle 22 and needle 17 work in conjunction to indicate the residual time between the preset time and the operation time. Setting needle 22 is mounted rotatably at the center of transparent protective scale cover 23 over scale 19. The shaft of needle 22 is coaxial to the shaft of needle 17 but is not physically connected to it. Prior to the commencement of operation of the digital timer, setting needle 22 is set at the value of the predetermined time which will be the same as the setting of knobs 9 and 10. As the digital timer operates needle 17 moves from its zero position on scale 19 towards the same value as that of needle 22 on transparent protective scale cover 23. When needle 17 reaches the value of the scale directly under needle 22, decimal circuits 5 and 6 will cause the relay 14 to return needle 17 to its initial zero value as explained hereinbefore. During the operation of the timer the residual time is always clearly indicated as the difference between the values of the two needles.

Figure 4:
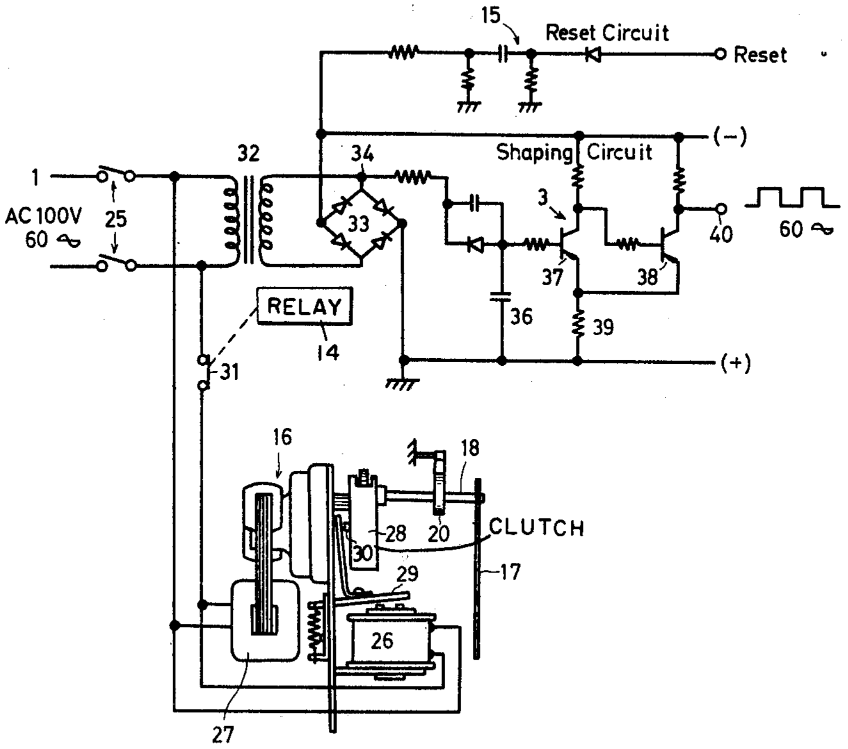
FIG. 4 is a circuit diagram of the display apparatus, the shaping circuit and the reset circuit of FIG. 2.

FIG. 4 shows the detailed circuitry of a part of the described inventions. Shown in this figure are the electrical source 1, the synchronous motor 16, the shaping circuit 3 and the reset circuit 15 which are shown in block form in FIG. 2.

Switch 25 connects the electrical source 1 to the digital timer. When switch 25 is closed manually or by means of any other device, such as relay contacts, the timer begins to operate. At the same instant exciting coil 27 and electromagnet 26 are energized. The electromagnet 26 operates a clutch on synchronous motor 16. Movable piece 29 is pulled toward electro-magnet 26 to push gear axis 30 of clutch 28, thereby engaging the clutch mechanism. The rotation of motor 16 is transmitted to shaft 18 by means of the clutch 28. Needle 17 is fixed onto shaft 18.

When relay 14 is operated as hereinbefore described, normally closed contact 31 is opened manually or by means of any other device, such as relay contacts, thereby deenergizing exciting coil 27 to stop motor 16 and also to release the clutch mechanism, thereby restoring needle 17 by means of restoring spring 20.

A rectifying circuit 33 is connected to the secondary side of a transformer 32 which is energized by the electrical source 1 when switch 25 is closed. The input wave to shaping circuit 3 is obtained from junction 34 of the rectifying circuit 33. Capacitor 36 absorbs the noise of operation. Transistors 37 and 38 form a standard Schmitt circuit having their emitters connected to common resistor 39. A rectangular wave of 60 c.p.s. is obtained to output terminal 40.

The reset circuit 15 is a differentiation circuit consisting of a capacitor and two parallel resistors. A differentiated pulse is generated at the reset output when a direct current is applied thereto after the electrical source is put on. The reset output signal is used to set counters 4, 5, 6 and flip-flop 12 to their original states.

Figure 5:
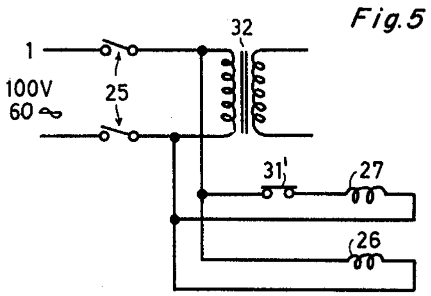
FIG. 5 is a circuit diagram of a second embodiment of the connection of an exciting coil and an electromagnet of a synchronous motor to an electrical power source.

FIG. 5 describes a second embodiment of the synchronous motor. Contact 31′ is placed in the line of exciting coil 27. When relay 14 operates, contact 31′ opens and synchronous motor 16 is deenergized. The clutch, however, is still operative so that the reduction gears are also effective. Spring 20 cannot restore the needle against the clutch mechanism. The needle thus remains at its indicating position although the motor is cut off. When the electrical supply 1 is cut off by opening switch 25, the clutch mechanism becomes deenergized and shaft 18 is disengaged from the reduction gears, permitting the needle 17 to restore itself to the zero position.

Thus the circuit of FIG. 5 provides a delayed action, whereby the relay operates to stop the motor but the pointer does not return to its original state until the electrical source is cut off by an external change of conditions.

FIG. 6 shows the detailed circuitry of "and" circuit 11, memory circuit 12 and amplifier 13 as shown in block form in FIG. 2.

"And" circuit 11 is comprised of three diodes and a resistor which is a well known diode "and" element or transistor "and" element.

Memory circuit 12 is a standard flip-flop circuit comprised of two transistors. The output of the "and" element is applied to the base electrode of the first transistor and the reset signal is applied to the base electrode of the second transistor. The memorized output of the flip-flop circuit is obtained from the collector electrode of the second transistor. The output of the flip-flop is applied to the base electrode of the amplifier transistor 13. When transistor 13 becomes conductive relay 14 is energized to cut off relay contact 31 to the motor circuit and contact **31*a*** (not shown) to the controlled circuits of the digital timer.

FIG. 7 shows the detailed circuitry of the six-nary counting circuit 4 referred to in FIG. 2. The input to the circuit comes from the output of the shaping circuit 3. The six-nary counter is a conventional device built of two binary counters, indicated by 2C, each having two terminals designated T1, T2 and T3, T4; a flip-flop having terminals T5, T6; two "and" circuits; and "or" circuit; a "net" circuit; and a differentiation circuit, indicated by ∂.

The operation of six-nary circuit 4 can be understood by means of the table shown in FIG. 8. The state of each terminal T, Tz . . . T6 is shown for successive increases of input pulses from 0 to 6. When the number of the input pulses coming from shaping circuit 3 is 0, that is, at the time the electrical source is first put on:

T1, T3, T5 are set 0
T2, T4, T6 are set 1

As the input pulses come sequentially the status changes as shown in FIG. 8. When the number of the input pulses becomes 5 the status is opposite to the status when no input pulses are applied. When the 6th input pulse is applied the status returns back to the original 0 input state.

Since the output is taken out of T5 through the "NOT" circuit, only one output is obtained, each 6 input pulses thus producing a six-nary counting circuit.

Figures 9, 10:
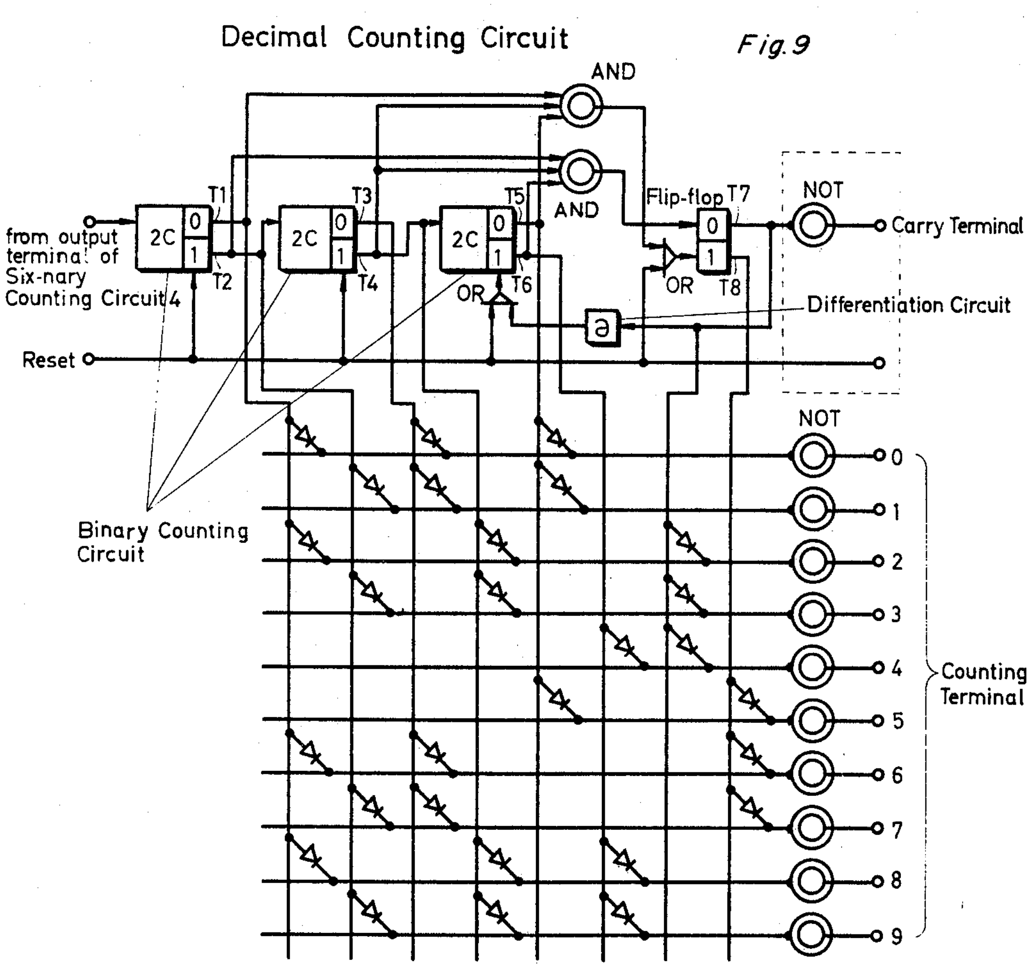
FIG. 9 is a circuit diagram of the decimal counting circuit of FIG. 2.
FIG. 10 is an operation table explaining the circuit of FIG. 9.

FIG. 9 shows the circuitry of the decimal counters 5 and 6 of FIG. 2. The counters use three binary counters, indicated as 2C: each with two terminals T1, T2 and T3, T4 and T5, T6; a flip-flop with terminals T7, T8; two "and" circuits; "or" circuits; and a differentiation circuit. The part of FIG. 9 in dotted lines is not part of the herein-before described circuit but is part of a conventional counter.

FIG. 10 contains a table of the status of terminals T1, T2 . . . T8 as the number of input pulses increase from 0 to 9. This figure explains the operation of the counter of FIG. 9. When the switch for the electrical source is put on, the number of the input pulses arriving at the flip-flop is zero and:

T1, T3, T5, T7, T9 are set 0
T2, T4, T6, T8, T10 are set 1

When the 9th input pulse is applied the status then is absolutely opposite to the status when no input is applied. When the 10th input pulsse is applied, the status returns back to the original 0 input pulse state. An output is taken out of T7 through the "NOT" circuit connected to T7 at a carry terminal as a decimal output.

The matrix circuit shown in FIG. 9 is well known in which "NOR" circuits are formed of a plurality of diodes and "NOT" circuits. As the pulses are succeedingly applied to the input terminal, the status on which an output exists travels on counting terminals 0, 1, 2, . . . .

Counting terminals 0, 1, 2, . . . 9 are connected to the stationary contact of rotary switch 7 in decimal circuit 5 and connected to the stationary contact of rotary switch 8 in decimal circuit 6, respectively.

As described herein, a digital timer is formed from a digital counter circuit and a synchronous motor in parallel with the counter circuit. The synchronous motor drives a needle to display the time elapsed in an analog manner. This facilitates reading of the time elapsed and time remaining for any operation. The digital counter switches can be set to extreme accuracy since it is unaffected by the displaying apparatus. Furthermore, even though the figures to be displayed may be plural in number, the disclosed invention does not need a plurality of discharge tubes corresponding to the number of figures displayed. In actuality this timer requires only one miniaturized display unit capable of displaying a plurality of figures.

What we claim as new and desire to secure by Letters Patent is:

1. A digital timer device comprising: a source of regularly occurring pulses; a static pulse counter coupled to said source of regularly occurring pulses to pass a signal when a predetermined number of said regularly occurring pulses have been received; an analog display means including a needle movable relative to a graduated disc by a motor energized by said source; and means to stop said needle actuated by the signal passed by said static pulse counter.

2. A digital timer device as in claim 1 wherein said analog display means comprises:

(a) an exciting coil energized by said source,
(b) a synchronous motor driven by said exciting coil,
(c) an electromagnet energized by said source to control a gear mechanism to engage a clutch assembly having a shaft with said synchronous motor,
(d) an indicating needle affixed to said clutch assembly shaft, and
(e) a graduated disc, whereby said indicating needle is caused to rotate around said graduated disc by said synchronous motor when said clutch is engaged.

3. The digital timer of claim 2 wherein said static counter comprises:

(a) a transformer energized by said electrical source,
(b) a shaping circuit connected to the secondary of said transformer,
(c) a numerical counting circuit fed by said shaping circuit,
(d) a plurality of decimal counters connected in series to the output of said numerical counting circuit,
(e) a plurality of rotary switches each operably connected to one of said plurality of decimal counters,
(f) an AND circuit fed by said plurality of switches, and
(g) a reset circuit triggered by said AND circuit.

4. The digital timer device of claim 3 including a spring connected to said indicating needle, and a contact on said reset circuit connected to said electric source, whereby when said reset circuit disconnects said electric source said spring restores said indicating needle to the initial position.

5. The digital timer device of claim 3 including a contact on said reset circuit coupled to said exciting coil to maintain said indicating needle fixed when said reset circuit disconnects said synchronous motor.

6. The digital timer device of claim 1 wherein said static pulse counter comprises:

(a) a transformer energized by said electrical source,
(b) a rectifying circuit connected to the secondary of said transformer,
(c) a shaping circuit at the output of said rectifying circuit,
(d) a divide by six counting circuit fed by said shaping circuit,
(e) a plurality of decimal counting circuits each containing ten output counting terminals fed by said divide by six counting circuit,
(f) a plurality of rotary switches each having ten stationary contacts and an output contact, each of said ten output counting terminals of the decimal counting circuits being connected to the stationary contacts of a one of said rotary switches,
(g) an "and" circuit connected to the output contact of each of said rotary switches,
(h) a flip-flop circuit fed by said "and" circuit,
(i) an amplifier fed by said flip-flop circuit, and
(j) a reset circuit fed by said amplifier.

7. The digital timer device of claim 3 wherein said graduated disc further comprises:

(a) a transparent cover, and
(b) a setting needle, whereby said setting needle is preset to indicate the time of operation to provide for the reading of the time remaining.

References Cited

UNITED STATES PATENTS

| | | | |
|---|---|---|---|
| 2,803,300 | 8/1957 | Warkentien | 58—147 |
| 2,973,107 | 2/1961 | Criswell | 58—39.5 |
| 3,175,052 | 3/1965 | Ludwig | 200—11 |

RICHARD B. WILKINSON, Primary Examiner

EDITH C. SIMMONS, Assistant Examiner

U.S. Cl. X.R.

58—145